US006983380B2

(12) United States Patent
Ko (10) Patent No.: US 6,983,380 B2
(45) Date of Patent: Jan. 3, 2006

(54) AUTOMATICALLY GENERATING VALID BEHAVIOR SPECIFICATIONS FOR INTRUSION DETECTION

(75) Inventor: Cheuk W. Ko, San Jose, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 979 days.

(21) Appl. No.: 09/778,623

(22) Filed: Feb. 6, 2001

(65) Prior Publication Data

US 2002/0138755 A1 Sep. 26, 2002

(51) Int. Cl.
  *G06F 11/30* (2006.01)
  *G06F 12/14* (2006.01)
  *H04L 9/00* (2006.01)
  *H04L 9/32* (2006.01)

(52) U.S. Cl. ............... 713/201; 713/200; 713/202; 706/12; 709/224; 709/223; 717/117

(58) Field of Classification Search ......... 713/200–202, 713/164–167; 709/223–224; 706/12; 717/117; 714/38, 37
See application file for complete search history.

(56) References Cited

U.S. PATENT DOCUMENTS 5,481,650 A * 1/1996 Cohen ..................... 706/12
6,779,120 B1 * 8/2004 Valente et al. ............ 713/201

OTHER PUBLICATIONS

Warrender "Detection Intrusions Using System Calls: Alternative Data Models" Dept. of Computer Science, University of New Mexico (or IEEE Computer Society, Symposium on Security and Privacy, pp. 133–145), 1999.*

Ko "Automated Detection of Vulnerabilities in Priveleged Programs by Executing Monitoring" Dept. of Computer Science, University of New Mexico, (or Proceeding of the 10–th annual Computer Security Applications Conference, pp. 134–144), Dec. 1994.*

Hofmeyr "Intrusion Detection using Sequence of System Calls" Dept. of Computer Science, University of New Mexico (or Journal of Computer Security, 6:151–180), Aug. 18, 1998.*

* cited by examiner

*Primary Examiner*—Ayaz Sheikh
*Assistant Examiner*—Longbit Chai
(74) *Attorney, Agent, or Firm*—Zilka-Kotab, PC; Christopher J. Hamaty (57) ABSTRACT

One embodiment of the present invention provides a system that automatically generates a valid behavior specification for use in an intrusion detection system for a computer system. The system operates by receiving an exemplary set of system calls that includes positive examples of valid system calls, and possibly negative examples of invalid system calls. The system automatically constructs the valid behavior specification from the exemplary set of system calls by selecting a set of rules covering valid system calls. This set of rules is selected to cover all positive examples in the exemplary set of system calls without covering negative examples. Moreover, the process of selecting a rule for the valid behavior specification involves using an objective function that seeks to maximize the number of positive examples covered by the rule while seeking to minimize the number of possible system calls covered by the rule. In one embodiment of the present invention, the system additionally monitors an executing program. During this monitoring process, the system receives a system call generated by the executing program. The system next determines whether the system call is covered by a rule from within the valid behavior specification. If not, the system generates and indication that the system call is invalid.

21 Claims, 3 Drawing Sheets

AUTOMATICALLY GENERATING VALID BEHAVIOR SPECIFICATIONS FOR INTRUSION DETECTION

BACKGROUND

1. Field of the Invention

The present invention relates computer security and intrusion detection systems. More specifically, the present invention relates to a method and an apparatus for automatically generating a valid behavior specification for use in an intrusion detection system.

2. Related Art

After more than a decade of research, intrusion detection has been widely adopted as a retrofit solution to the increasingly important problem of computer security. Many commercial intrusion detection systems (IDSs) have been developed and pushed onto the market. Some of these IDSs can reliably detect penetrations that employ known attack methods, which account for the majority of the attack incidents. Nevertheless, attackers are getting more advanced and sophisticated. Attackers increasingly make use of automated scripts to attack systems from different locations in a short period of time. In addition, they attempt to escape IDS detection by using new attack methods (e.g., exploiting a new vulnerability) that are not modeled by the signature database of an IDS. Real-time detection of previously unseen attacks with high accuracy and a low false alarm rate remains a challenge.

Current intrusion detection approaches—anomaly detection, misuse detection, and specification-based detection—have different strengths with regards to detecting unknown attacks. Anomaly detection, which identifies intrusive activities based on deviations from a normal behavior profile, is able to detect unknown attacks because the normal profile is independent of the system vulnerability. Many different techniques have been employed to establish normal behavior profiles from historical behavior. The major difficulty remains to detect intrusions accurately and minimize the false alarm rate. Also, most techniques identify a procedure for detecting attacks without explaining why the detected incident is an attack, what went wrong, or how to fix the problem.

Misuse detection, though widely employed to detect known attacks, also has the potential to detect unknown attacks. This capability arises from the fact that generic signatures/rules can be written to detect classes of attacks that have similar manifestations (e.g., buffer-overflow attacks). In principle, one might be able to hypothesize attacks based on models of attacks and vulnerabilities and develop generic signatures to detect the attacks. However, little research has been done on how to write generic signatures and there is no systematic methodology for developing generic signatures.

Specification-based techniques, which detect deviations of executing programs from valid behavior, have shown early promise for detecting previously unseen attacks. Specification-based detection approaches the problem from a human-reasoning perspective, trying to develop "formally" what is valid based on the functionality of the program, its usage, and the system security policy. The premise is that penetrations often cause privileged programs to behave differently from their intended behavior, which, for most programs, is fairly regular and can be concisely specified. It can achieve a very low false alarm rate and can explain why the deviation is an intrusion. Nevertheless, specifications presently have to be written by system and security experts for every security-critical program in a system. This is a very time-consuming and expensive process.

What is needed is a method and an apparatus for automating the process of generating a valid behavior specification for use in detecting previously unseen attacks through intrusion detection system.

SUMMARY

One embodiment of the present invention provides a system that automatically generates a valid behavior specification for use in an intrusion detection system for a computer system. The system operates by receiving an exemplary set of system calls that includes positive examples of valid system calls, and possibly negative examples of invalid system calls. The system automatically constructs the valid behavior specification from the exemplary set of system calls by selecting a set of rules covering valid system calls. This set of rules is selected to cover all positive examples in the exemplary set of system calls without covering negative examples. Moreover, the process of selecting a rule for the valid behavior specification involves using an objective function that seeks to maximize the number of positive examples covered by the rule while seeking to minimize the number of possible system calls covered by the rule.

In one embodiment of the present invention, the objective function additionally seeks to minimize the number of privileged system calls covered by the rule.

In one embodiment of the present invention, the objective function additionally seeks to minimize a length of the rule.

In one embodiment of the present invention, the system additionally monitors an executing program. During this monitoring process, the system receives a system call generated by the executing program. The system then determines whether the system call is covered by a rule from within the valid behavior specification. If not, the system generates and indication that the system call is invalid.

In one embodiment of the present invention, the system additionally produces the exemplary set of system calls by running an exemplary program and recording system calls generated by the exemplary program.

In one embodiment of the present invention, the exemplary set of system calls include calls to functions implemented by an operating system of the computer system.

In one embodiment of the present invention, the set of rules covering valid system calls includes at least one Horn clause.

In one embodiment of the present invention, the system selects a rule for the valid behavior specification by selecting a positive example from the exemplary set of system calls. The system uses this positive example to construct a Horn clause by iterating through a subsumption lattice, starting from a most general possible clause and proceeding to a most specific clause for the positive example, and selecting a Horn clause that maximizes the objective function without covering any negative examples. Next, the system adds the selected Horn clause to the set of rules in the valid behavior specification. The system also removes other positive examples covered by the Horn clause from the exemplary set of system calls, so that subsequently selected Horn clauses do not have to cover the other positive examples.

BRIEF DESCRIPTION OF THE FIGURES

Table 1 illustrates and exemplary set of system calls and corresponding rules in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
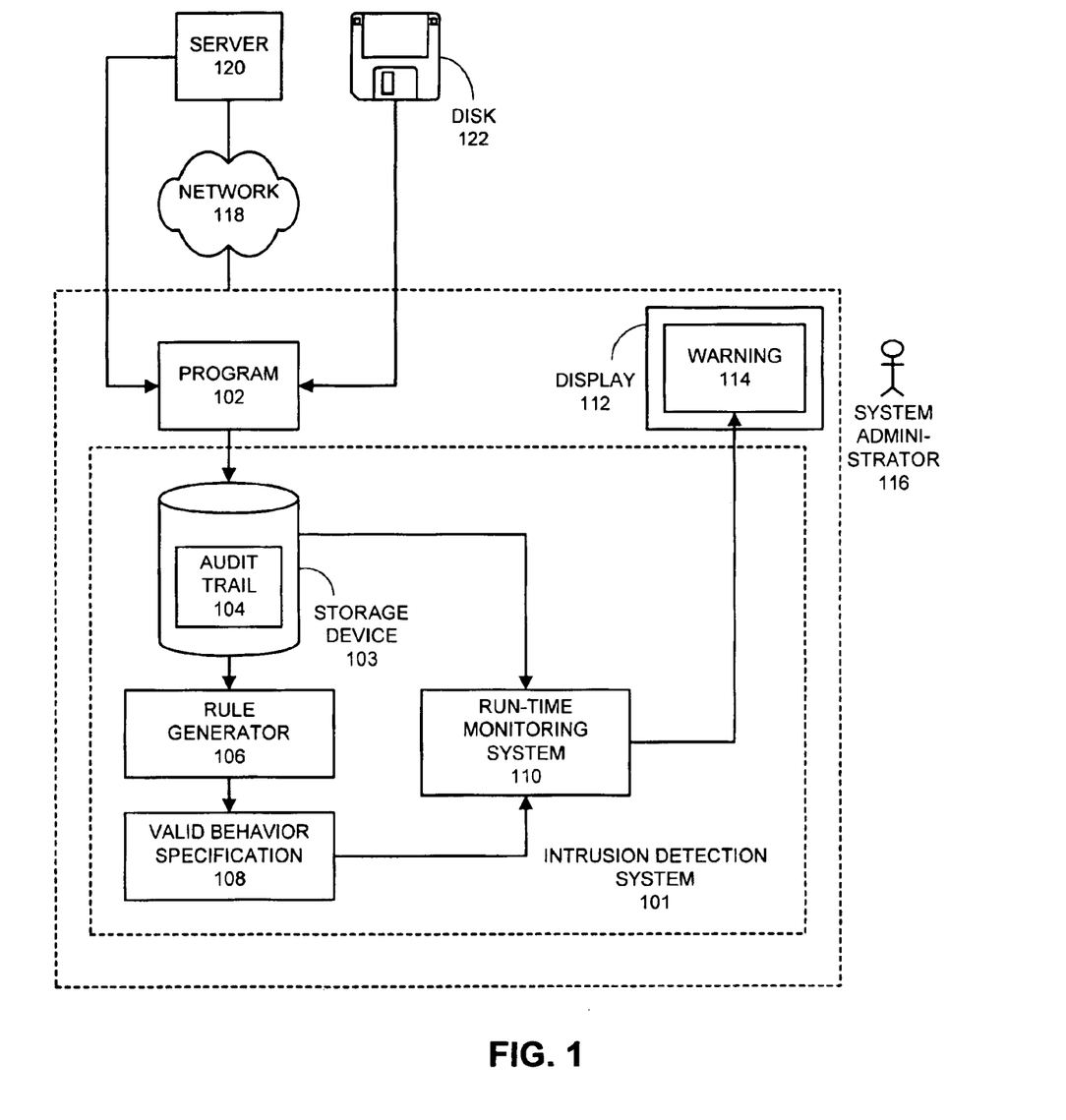
FIG. 1 illustrates a computer system with an intrusion detection system in accordance with an embodiment of the present invention.

FIG. 1 illustrates a computer system 100 that contains an intrusion detection system 101 in accordance with an embodiment of the present invention. Computer system 100 executes a program 102, which can be introduced into computer system 100 in a number of ways, such as by transmission from server 120 across network 118 into computer system 100, or through introduction of a disk 122 containing program 102 into computer system 100.

Server 120 can generally include any computational node including a mechanism for servicing requests from a client for computational and/or data storage resources. Network 118 can generally include any type of wire or wireless communication channel capable of coupling together computing nodes. This includes, but is not limited to, a local area network, a wide area network, or a combination of networks. In one embodiment of the present invention, network 118 includes the Internet. Disk 122 can include any type of non-volatile storage device that can be inserted into computer system 100. This includes, but is not limited to, magnetic, optical, and magneto-optical storage devices, as well as storage devices based on flash memory and/or battery-backed up memory.

Intrusion detection system 101 includes storage device 103, rule generator 106 that generates valid behavior specification 108, and run-time monitoring system 110 that possibly generates a warning 114 to display 112.

During execution of program 102, an audit trail 104 of the system calls generated by program 102 is stored on storage device 103. During a behavior specification generation process, audit trail 104 is fed through rule generator 106 in order to generate a set of rules that comprise valid behavior specification 108. The operation of rule generator 106 is described in more detail below with reference to FIG. 3.

During a program monitoring process, run-time monitoring system 110 receives an audit trail 104 from an executing program 102 and uses valid behavior specification 108 to determine whether audit trail 104 contains any invalid system calls. If so, run-time monitoring system outputs a warning 114 to display 112 in order to inform system administrator 116 of a possible attack on computer system 100 by program 102.

Process of Intrusion Detection

Figure 2:
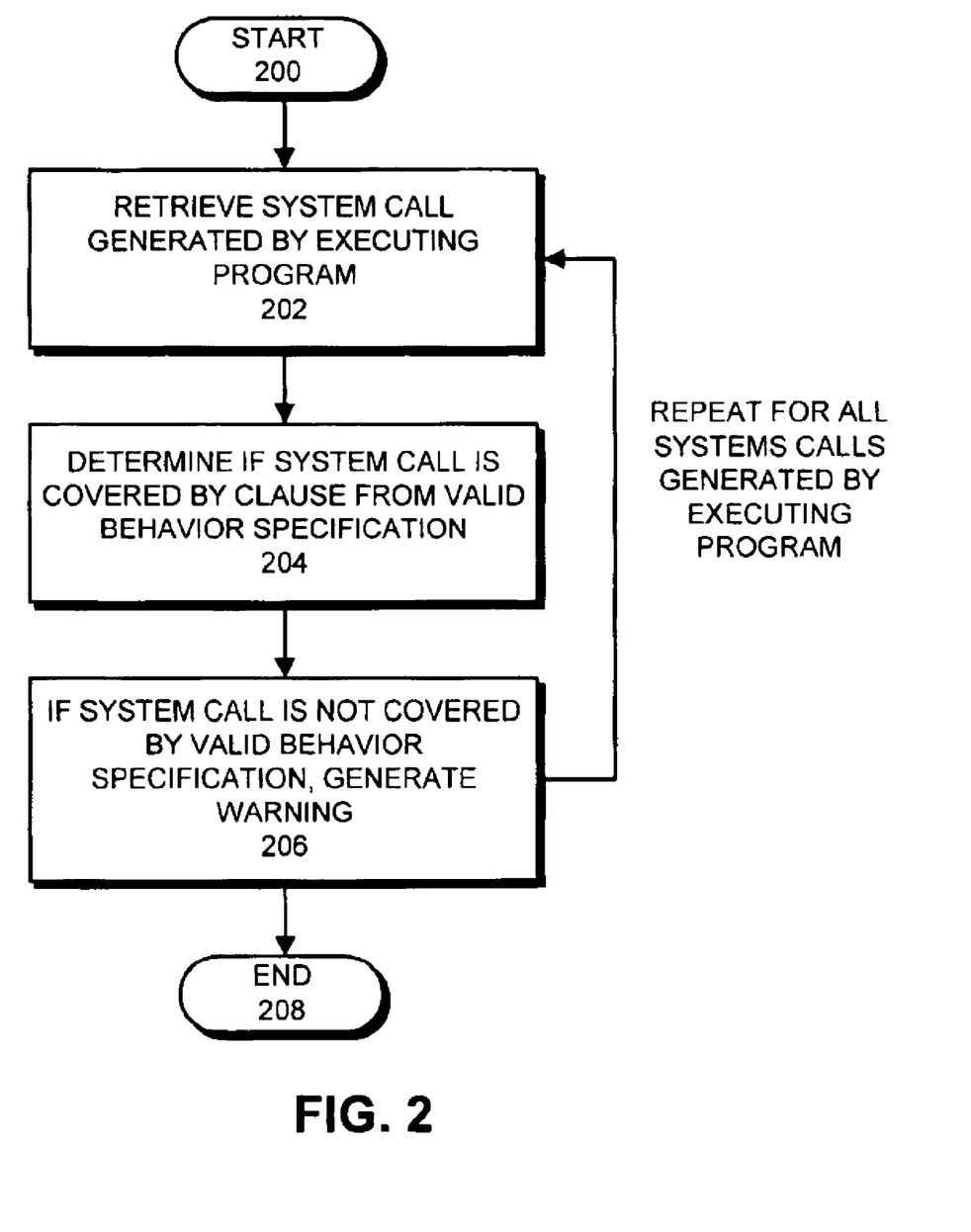
FIG. 2 is a flow chart illustrating the process of intrusion detection using a valid behavioral specification in accordance with an embodiment of the present invention.

FIG. 2 is a flow chart illustrating the process of intrusion detection using a valid behavior specification 108 in accordance with an embodiment of the present invention. During this process, run-time monitoring system 110 within intrusion detection system 101 receives audit trail 104, which includes a series of system calls generated by an executing program 102.

For each system call, run-time monitoring system 110 first retrieves the system call (step 202), and then determines if the system call is covered by a clause (rule) from within valid behavior specification 108 (step 204). If not, the system call is invalid. This causes the system to generate a warning 114 (step 206). Next, some action can be taken, such as displaying warning 114 to system administrator 116. These steps are repeated for all system calls generated by executing program 102.

Process of Generating Valid Behavior Specification

Generally speaking, a valid behavior specification of a program constrains the sequence of operations that can be performed by the program during execution. One embodiment of the present invention learns the set of valid operations (or accesses) of a program while ignoring the ordering of the accesses. In particular, one embodiment of the present invention considers operations of a program at the kernel boundary, where system calls are invoked to perform access to objects.

Informally, a valid behavior specification of a program classifies individual operations of the program as either valid or invalid. One embodiment of the present invention makes use of example runs of a program, including a set of valid execution traces, and a set of possibly empty invalid execution traces to construct a valid behavior specification. These traces are collected by running a program under attacks on a securely configured host. This valid behavior specification satisfies the following criteria.

Completeness:
All operations in a valid trace should be classified valid.
Consistency:
For every invalid trace (or intrusion trace), a valid behavior specification should classify at least one operation as invalid.
Compactness:
The specification should be concise so that it can be readily inspected by a human and so that it can be more easily used for real-time detection. One simple compactness measure is the number of rules (or clauses) in a specification.
Predictability:
The specification should be able to explain future execution traces without a high false alarm rate.
Detectability:
The specification should fit closely to the actual valid behavior and reject future execution traces which are intrusions.

Completeness and consistency are verifiable criteria, which can be formulated and checked against a set of example traces. However, it is more difficult to evaluate predictability and detectability of a specification because there could be infinite number of future valid traces and intrusion traces.

Below are some techniques or guidelines for developing valid behavior specifications, that attempt to codify security knowledge to achieve better predictability and detectability.

Least Access

To maximize the chance of detecting intrusions, a valid behavior specification should tightly restrict the resources that are accessible by a program, where such resources can include concrete file objects or abstract network services. One important guideline is to allow a program to access to only resources that are needed by the program for accomplishing its objectives. This is actually a variant of the "least privileged principle". In general, we can identify the valid accesses from the functionality of the program and normal execution of the program. In addition, the allowable operations of a program may be site-specific, depending on the usage, because a particular site may not use all the functions of a program.

Attributes of Operations

The validity of an operation usually depends not only on its type, but also other parameters such as the attributes of the process which performs the operation (e.g., process ID, user ID of the owner of the process), attributes of the object being accessed (e.g., permission modes), and other abstract state information. It is useful to identify the attributes whose values must be known for distinguishing intrusions from legitimate behavior, and to include the relevant attributes in the model so that the attributes will be considered by the learning algorithm. In general, attributes about the process, system call arguments, the path name, and the object being accessed are important. Also important are the creator of an object, and the user on behalf of which the program is running. Attributes that can uniquely identify an object are also important.

Generalization

In the development of a valid behavior specification, it is useful to identify commonality of the operations (e.g., having the world-readable permission bit on) of a program, and to produce a rule that explain many operations. Such a generalization process enhances the conciseness of a specification. Also, the operations of a program may vary across executions, depending on the input, configurations, and environment. Generalization is useful for predicting operations in future executions of programs. For example, in the Unix operating system, a program may use a file-name generation function to obtain a name for a temporary file, and this name will be different in different executions. It is important to observe some characteristics of the temporary files (e.g., they all share the same prefix) to produce a general rule that can explain the operations related to the temporary file.

On the other hand, a general rule that explains many valid operations of a program may also cover many unnecessary operations. Therefore, it is very important to strike a balance between generalization and least access and to develop general rules in an intelligent manner. For example, even observing that a program writes to many files in the /etc directory, one would not use a rule to allow the program to write to all the files in the /etc directory, because such a rule allows the program to write to many security-critical files that may not need to be accessed by the program. Hence, a good rule should explain many valid operations but no invalid operations, and should not cover too many other high-privileged operations.

Inductive Logic Programming

Generally speaking, Induction logic programming (ILP) constructs knowledge from examples, both represented in first order logic, by reversing the process of deductive inference.

Deductive inference derives consequences E from a prior theory C. For example, if C says that all kinds of birds have wings, E might state that a particular kind of bird (e.g. a pigeon) has wings. Inductive inference derives a general belief C from specific beliefs E. After observing that eagles, pigeons, and sea gulls have wings, C might be conjecture that all kinds of birds have wings. Inductive inference is a very common form of everyday reasoning. Formally, the general problem of ILP is, given background knowledge B and examples E (E+∪E−). Find the simplest consistent hypothesis H such that B and H models E.

As an example, imagine trying to learn about the concept of "father". You are given some background knowledge B about particular parents and their children as well as well as their genders. B=male(calvin), male(timothy), female (mandy), female(victoria), parent(calvin, timothy), parent (calvin, victoria), parent(mandy, timothy), and parent (mandy, victoria).

You are also given the following facts, which include the relationships between particular fathers and their children (positive examples E+) and the relationships that do not hold (negative examples E−). E+=father(calvin,timothy), father (calvin,victoria). E−=!father(mandy,timothy), !father (mandy,victoria) and !father(calvin,mandy).

The goal of ILP is to learn the target relation "father" from the given background knowledge B and example E (E+∪E−). For example, from the above knowledge and facts, ILP can be used to learn the following concept of father: father(X,Y)←parent(X,Y) and male(X).

Specification Learning Problem

One embodiment of the present invention models the valid operations of a program using a set of system-call predicates, each describing the valid operations associated with one particular system call (e.g., read, write, execve). In general, an operation performed by a program denotes an execution of a system call, and is represented by a ground literal (i.e., an atomic formula without any variables), scall $(t_1, t_2, t_3, \ldots, t_n)$, where scall $\in$ SC, the set of system-call predicate symbols, and $t_i$, $1 \leq i \leq t_n$, are terms describing various attributes (e.g., pathname of the object, ID of the process performing the operation) of the operation. (see Table 1 for examples of operations.) A trace of a program execution is an ordered set of operations performed by the program execution. If we ignore the order of the operations, we can view a trace as a set of operations and represent a trace as a set of ground literals.

Note that it is important to include attributes of operations which values can affect the validity of the operations.

More formally, given example runs of a program consisting of a set of valid trace calls $T_V$ and a set of possibly empty intrusion trace calls $T_I$, our problem is to construct a set of Horn clauses S of the form scall$(a_1, a_2, \ldots, a_i) \leftarrow L_1, L_2, \ldots, L_j$.

where scall $\in$ SC and $L_1, L_2, \ldots, L_j$ are literals defined in the background knowledge B, such that the following constraints are satisfied.

B and S models t∀t∈$T_V$ (Completeness)
B and S does not model t∀t∈$T_I$ (Consistency)
The set of Horn clauses S is called a "valid behavior specification". The set of clauses B and P form a logic program which defines the relationships among the attributes in a valid operation of a program.

To cast our problem as an ILP problem, an example set of valid operations (E+) should be obtained by including all operations in all valid traces into the set. In addition, an example set of invalid operations (E−) should be constructed by selecting at least one invalid operation from each intrusion trace. Note that not all the operations in the intrusion traces are invalid. In fact, operations in a valid trace and operations in an intrusion trace could overlap. Therefore, it is important to extract operations that are truly invalid for inclusion in E−. In general, obtaining a good set of invalid operations from intrusion traces of a program is not an easy process.

The lack of attack data further hinders the problem of getting invalid examples. In view of this problem, the learning algorithm is designed to work well with only valid example operations.

Induction Algorithm

This section describes the ILP algorithm for constructing a valid behavior specification from background knowledge and examples. ILP can be viewed as a search problem in which a space of candidate solutions is searched to find the best solution with respect to some acceptance criterion characterizing solutions to the ILP problem. In principle, the problem can be solved using a naive generate and test algorithm. However, such an algorithm is computationally expensive. Therefore, different techniques based on different theories are employed to structure the solution space to allow for pruning of the search so that a good solution can be found efficiently. One embodiment of the present invention employs the Mode Directed Inverse Entailment (MDIE) approach to confine and structure the search space of the solution specifications.

of the program execution, the second parameter denotes the process which performs the operation, the third parameter denotes the path name of the object, the fourth parameter denotes the attributes of the object (e.g., user ID of the owner), and the last parameter denotes the owner, group and the permission mode of the object. ILP can be used to synthesize the knowledge shown in Table 1(b), which allows reading of any files inside the /etc directory. The predicate indir(F, D) means that the path F is inside the directory D.

However, from a security perspective, the clause in Table 1(b) is not a good rule for explaining the valid operations because it allows ping to access many unnecessary privileged files in the /etc directory. An attacker gaining controls of the program could perform these privileged operations (e.g., read /etc/master.passwd, which contains the passwords of users in plain text, without being detected by the specification. Therefore, we can select other clauses to explain the examples (see Table 1(c)), which allow the ping program to read the etc/spwd.db file and only files inside the /etc directory that are also publicly readable.

Generality and Privilege

We introduce two quantitative measures of a hypothesis clause: generality and privilege for evaluation of the quality a hypothesis with respect to security. The generality of a hypothesis clause measures how broad are the objects that are allowed to be accessed by the hypothesis. For example, the generality of read(S, P, N, F, M):- worldreadable(M) is high because there are many files that are publicly readable. On the other hand, the generality of read(S, P, N, F, M:- isfile(N, "/etc/passwd") is very low since there is only one file whose name is "/etc/passwd".

The privilege of a hypothesis clause is a measure of the privileges of the operations allowed by the hypothesis. For

TABLE 1

(a) An example list of operations produced by the program "ping"
    read(s(657, joe), p(657, 0, 1), /etc/mtab, f(0, 0, 19232), m(6, 4, 4)).
    read(s(657, joe), p(657, 0, 1), /etc/networks, f(0, 0, 14382), m(6, 4, 4)).
    read(s(657, joe), p(657, 0, 1), /etc/protocols, f(0, 0, 1530), m(6, 4, 4))).
    read(s(657, joe), p(657, 0, 1), /etc/hosts, f(0, 0, 2534), m(6, 4, 4)).
    read(s(657, joe), p(657, 0, 1), /etc/spwd.db, f(0, 0, 1933), m(6, 0, 0)).
(b) Knowledge synthesized by the ILP system
    read(S, P, N, F, M):-indir(N, /etc).
(c) The desired knowledge constructed by the ILP system with considerations for security
    read(S, P, N, F, M):-indir(N, /etc), worldreadable(M).
    read(S, P, N, F, M):-isfile(N, /etc/spwd.db).

Finding the Best Solution

Besides confining and structuring the search space to allow for efficient searching, another aspect of ILP is evaluating the candidate solutions. In particular, there could be many candidate solutions that satisfy the completeness, consistency, and compactness criteria. We need to identify from them the best solution with respect to predictability and detectability.

Most ILP tools use similar evaluation criteria, which identify the best clause as a clause that achieves the highest compression, that is, the simplest clause that can explain the largest number of positive examples, without incorrectly explaining any negative examples. For learning with positive only data, many ILP algorithms estimate the probability distribution of positive and negative examples and assume the positive examples are gathered by drawing randomly from all the examples and discarding negative examples drawn. Note that existing ILP evaluation methods do not apply to our problem well. We illustrate the limitations of existing ILP algorithms using the example shown in Table 1.

Table 1(a) shows an example list of operations produced by the ping program. The first parameter denotes the identity example, the privilege of write(S, P, N, F, M):- own(root, F) is high because it encompasses many privileged operations (e.g., write operations to the password file). Obviously, the more general a hypothesis is, the greater is its generality and privilege. Any generality function and privilege function should satisfy this criterion, as described below.

A generality function g over a set of well-formed formula wwf is well defined if and only if for any clauses C1 and C2, C1 models C2 implies $g(C1) \geq g(C2)$. A privilege function p over a set of wff is well defined if and only if for any clauses C1 and C2, C1 models C2 implies $p(C1) \geq p(C2)$.

Given a snapshot of a system consisting of a set of objects O, wherein H is a wff, the generality g of H is $g(H)=|O_H|/|O|$, $O_H=\{O_{op}|B \text{ and } H \text{ models op}\}$, where $O_{op} \in$ denotes the object associated with the operation op. The function g is well defined because if H models $H_1$, then $O_{H1} \subseteq O_H$ by the definition of $O_H$ and $O_{H1}$. Hence, $g(H) \geq g(H_1)$.

Let H be a wff and let P be a mapping over the set X of possible operations which assigns a privilege value from 0 to 1 to every possible operation. The privilege p of H is defined as, p(H)=max P(op), wherein B and H models op, op∈X The functions p are well defined. Suppose $p(H_1)$ is v, this implies that there exist an operation op such that B and $H_1$ models op and P(op)=v. If H models $H_1$, then B and H models op, hence $p(H) \geq p(H_1)$.

Figure 3:
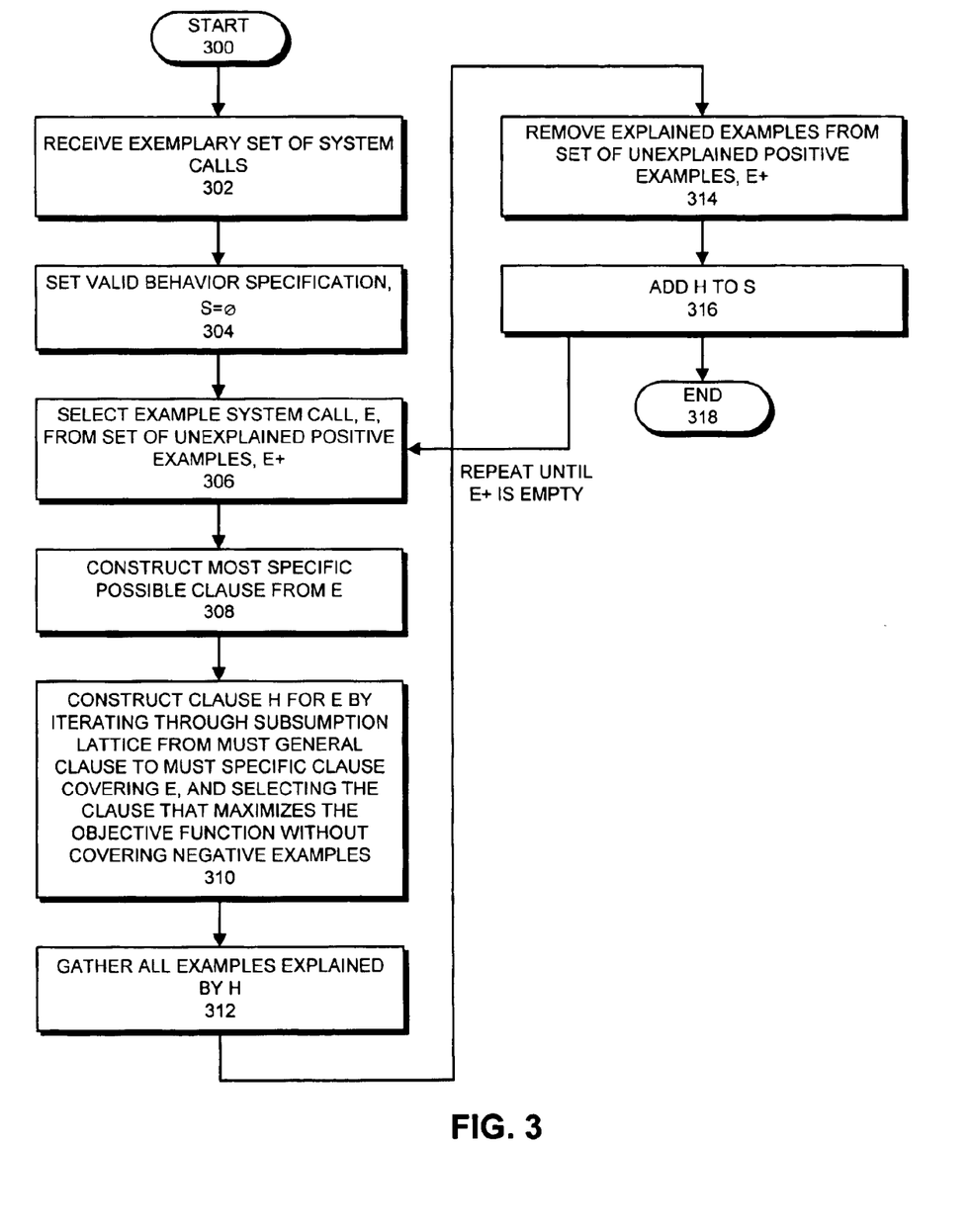
FIG. 3 is a flow chart illustrating the process of generating a valid behavior specification for a program in accordance with an embodiment of the present invention.

FIG. 3 is a flow chart illustrating the process of generating a valid behavior specification 108 for a program 102 in accordance with an embodiment of the present invention. The process starts when the system receives an exemplary set of system calls, including positive examples, E+, and negative examples, E− (step 302). Next, the system sets the valid behavior specification, S, to be empty (step 304).

The system then selects an example system call, e, from the set of unexplained positive examples, E+(step 306), and constructs the most specific possible clause from e (step 308).

Next, the system constructs a clause, H, for e by iterating through subsumption lattice from the most general clause to the most specific clause covering e, and selecting the clause that maximizes the objective function $f_h$ without covering negative examples (step 310).

In one embodiment of the present invention, the objective function is $f_h=e_h-(g_h+p_h+c_h)$, where: $g_h$=the generality of h; $p_h$=the privilege of h; $c_h$=the length of the clause h; and $e_h$=the explanation power—number of valid traces which can be partially explained by the clause h. Note that a clause partially explains a trace when the clause explains at least one operation in the trace.

Note that the values $g_h$ and $p_h$ are normalized to range from 1 to the total number of valid traces. The value f is set to favor short, low-privilege, and low-generality clauses but to be able to explain examples in many traces (high-explanation power). This minimizes the privilege of the hypothesis and allows just the operations needed by a program, while not making the specification too complex. In addition, we set the explanation power $e_h$ to be the number of valid traces that can be partially explained by the clause h. That is, $e_h=|W_h|$ where $W_h=\{T|\exists op \in T s.t.$ B and h models op, $T \in T_V\}$.

Next, the system gathers all examples, E', explained by H (step 312), and removes any explained examples from the set of unexplained positive examples, E+ (step 314). This is done so that subsequently selected Horn clauses do not have to cover the explained positive examples. Next, the system adds H to the valid behavior specification S (step 316). Steps 306 through 316 are then repeated until the set of unexplained positive examples, E+, is empty.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically generating a valid behavior specification for use in an intrusion detection system for a computer system, comprising:
   receiving an exemplary set of system calls that includes positive examples of valid system calls, and possibly negative examples of invalid system calls; and
   automatically constructing the valid behavior specification from the exemplary set of system calls by selecting a set of rules covering valid system calls;
   wherein the set of rules covers all positive examples in the exemplary set of system calls without covering negative examples;
   wherein selecting a rule for the valid behavior specification involves using an objective function that seeks to maximize the number of positive examples covered by the rule while seeking to minimize the number of possible system calls covered by the rule;
   wherein the objective function additionally seeks to minimize the number of privileged system calls covered by the rule and minimize a length of the rule; and
   wherein the objective function includes: $f_h=e_h-(g_h+p_h+c_h)$, where:
   $g_h$=the generality of clause h;
   $p_h$=the privilege of the clause h;
   $c_h$=the length of clause h; and
   $e_h$=the explanation power.

2. The method of claim 1, wherein the method further comprises monitoring an executing program by:
   receiving a system call generated by the executing program;
   determining whether the system call is covered by a rule from within the valid behavior specification; and
   if the system call is not covered by a rule from within the valid behavior specification, indicating that the system call is invalid.

3. The method of claim 1, further comprising producing the exemplary set of system calls by running an exemplary program and recording system calls generated by the exemplary program.

4. The method of claim 1, where the exemplary set of system calls includes calls to functions implemented by an operating system of the computer system.

5. The method of claim 1, wherein the set of rules includes at least one Horn clause.

6. The method of claim 5, wherein selecting a rule for the valid behavior specification involves:
   selecting a positive example from the exemplary set of system calls;
   constructing a Horn clause for the positive example by iterating through a subsumption lattice, starting from a most general possible clause and proceeding to a most specific clause for the positive example, and selecting a Horn clause that maximizes the objective function without covering any negative examples;
   adding the Horn clause to the set of rules in the valid behavior specification; and
   removing other positive examples covered by the Horn clause from the exemplary set of system calls, so subsequently selected Horn clauses do not have to cover the other positive examples.

7. A computer-readable storage medium storing instructions that when executed by a computer cause the computer to perform a method for automatically generating a valid behavior specification for use in an intrusion detection system for a computer system, the method comprising:
   receiving an exemplary set of system calls that includes positive examples of valid system calls, and possibly negative examples of invalid system calls; and automatically constructing the valid behavior specification from the exemplary set of system calls by selecting a set of rules covering valid system calls; wherein the set of rules covers all positive examples in the exemplary set of system calls without covering negative examples; wherein selecting a rule for the valid behavior specification involves using an objective function that seeks to maximize the number of positive examples covered by the rule while seeking to minimize the number of possible system calls covered by the rule;

wherein the objective function additionally seeks to minimize the number of privileged system calls covered by the rule and minimize a length of the rule; and wherein the objective function includes: $f_h = e_h - (g_h + p_h + c_h)$, where:

$g_h$ = the generality of clause h;

$p_h$ = the privilege of the clause h;

$c_h$ = the length of clause h; and $e_h$ = the explanation power.

8. The computer-readable storage medium of claim 7, wherein die method further comprises monitoring an executing program by:

receiving a system call generated by the executing program;

determining whether the system call is covered by a rule from within the valid behavior specification; and if the system call is not covered by a rule from within the valid behavior specification, indicating that the system call is invalid.

9. The computer-readable storage medium of claim 7, wherein the method further comprises producing the exemplary set of system calls by running an exemplary program and recording system calls generated by the exemplary program.

10. The computer-readable storage medium of claim 7, where the exemplary set of system calls includes calls to functions implemented by an operating system of the computer system.

11. The computer-readable storage medium of claim 7, wherein the set of rules includes at least one Horn clause.

12. The computer-readable storage medium of claim 11, wherein selecting a rule for the valid behavior specification involves:

selecting a positive example from the exemplary set of system calls;

constructing a Horn clause for the positive example by iterating through a subsumption lattice, starting from a most general possible clause and proceeding to a most specific clause for the positive example, and selecting a Horn clause that maximizes the objective function without covering any negative examples;

adding the Horn clause to the set of rules in the valid behavior specification; and removing other positive examples covered by the Horn clause from the exemplary set of system calls, so subsequently selected Horn clauses do not have to cover the other positive examples.

13. An apparatus that is configured to automatically generate a valid behavior specification for use in an intrusion detection system for a computer system, comprising: a receiving mechanism that is configured to receive an exemplary set of system calls that includes positive examples of valid system calls, and possibly negative examples of invalid system calls; and a specification construction mechanism that is configured to automatically construct the valid behavior specification from the exemplary set of system calls by selecting a set of rules covering valid system calls; wherein the set of rules covers all positive examples in the exemplary set of system calls without covering negative examples; wherein the specification construction mechanism is configured to select a rule for the valid behavior specification by using an objective function that seeks to maximize the number of positive examples covered by the rule while seeking to minimize the number of possible system calls covered by the rule;

wherein the objective function additionally seeks to minimize the number of privileged system calls covered by the rule and minimize a length of the rule; and wherein the objective function includes: $f_h = e_h - (g_h + p_h + c_h)$, where:

$g_h$ = the generality of clause h;

$p_h$ = the privilege of the clause h;

$c_h$ = the length of clause h; and $e_h$ = the explanation power.

14. The apparatus of claim 13, wherein the apparatus further comprises a program monitoring mechanism that is configured to:

receive a system call generated by an executing program;

determine whether the system call is covered by a rule from within the valid behavior specification; and to indicate that the system call is invalid, if the system call is not covered by a rule from within the valid behavior specification.

15. The apparatus of claim 13, further comprising a trace generation mechanism that is configured to produce the exemplary set of system calls by running an exemplary program and recording system calls generated by the exemplary program.

16. The apparatus of claim 13, where the exemplary set of system calls includes calls to functions implemented by an operating system of the computer system.

17. The apparatus of claim 13, wherein the set of rules includes at least one Horn clause.

18. The apparatus of claim 17, wherein in selecting a rule for the valid behavior specification, the specification construction mechanism is configured to:

select a positive example from the exemplary set of system calls;

construct a Horn clause for the positive example by iterating through a subsumption lattice, starting from a most general possible clause and proceeding to a most specific clause for the positive example, and selecting a Horn clause that maximizes the objective function without covering any negative examples;

add the Horn clause to the set of rules in the valid behavior specification; and to remove other positive examples covered by the Horn clause from the exemplary set of system calls, so subsequently selected Horn clauses do not have to cover the other positive examples.

19. The method of claim 1, 7 and 13, wherein the values $g_h$ and $p_h$ are normalized to range from 1 to the total number of valid traces.

20. The method of claim 19, wherein the value $f$ is set to favor short, low-privilege, and low-generality clauses while explaining examples in many traces.

21. The method of claim 1, 7 and 13, wherein the explanation power is a number of valid traces that can be at least partially explained by the clause h.

* * * * *

UNITED STATES PATENT AND TRADEMARK OFFICE
CERTIFICATE OF CORRECTION

PATENT NO.        : 6,983,380 B2                                                      Page 1 of 1
APPLICATION NO.   : 09/778623
DATED             : January 3, 2006
INVENTOR(S)       : Ko It is certified that error appears in the above-identified patent and that said Letters Patent is hereby corrected as shown below:

Col. 11, line 15, replace "die" with -- the --.

Signed and Sealed this

Fifth Day of October, 2010

David J. Kappos
*Director of the United States Patent and Trademark Office*